(12) United States Patent
Kim (10) Patent No.: US 7,778,628 B2
(45) Date of Patent: Aug. 17, 2010

(54) MOBILE COMMUNICATION TERMINAL AND CALL CONNECTION METHOD USING THE SAME

(75) Inventor: Sun Mi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 210 days.

(21) Appl. No.: 11/516,643

(22) Filed: Sep. 7, 2006

(65) Prior Publication Data

US 2007/0054669 A1   Mar. 8, 2007

(30) Foreign Application Priority Data

Sep. 7, 2005   (KR) ...................... 10-2005-0083314

(51) Int. Cl.
H04M 3/42   (2006.01)
(52) U.S. Cl. ...................... 455/414.1; 455/418; 455/417
(58) Field of Classification Search ................. 455/415, 455/418
See application file for complete search history.

(56) References Cited

U.S. PATENT DOCUMENTS

| | | | |
|---|---|---|---|
| 5,247,569 A | | 9/1993 | Cave |
| 5,799,071 A * | 8/1998 | Azar et al. ............. 379/114.02 |
| 6,380,911 B1 * | 4/2002 | Eaton ............................ 345/30 |
| 6,807,413 B1 * | 10/2004 | Honda ...................... 455/414.1 |
| 7,072,460 B2 * | 7/2006 | Wong et al. ............. 379/355.05 |
| 2004/0157606 A1 * | 8/2004 | Lee .......................... 455/435.1 |

FOREIGN PATENT DOCUMENTS

| | | |
|---|---|---|
| CN | 1209713 A | 3/1999 |
| JP | 8-19049 A | 1/1996 |
| JP | 2001-352577 A | 12/2001 |
| KR | 10-2000-0020389 A | 4/2000 |
| KR | 10-2001-0009947 A | 2/2001 |

OTHER PUBLICATIONS

Sprint OCS Vision Smart Device 650 by Palm user guide www.palm.com/us/support/treo/treo650sprint/ Jul. 2005; pp. 1-220.*

* cited by examiner

Primary Examiner—Vincent P Harper
Assistant Examiner—Natasha Cosme
(74) Attorney, Agent, or Firm—Birch, Stewart, Kolasch & Birch, LLP (57) ABSTRACT

A mobile communication terminal and corresponding method, the method including (a) attempting origination of a call to a first terminal, (b) receiving a call from a second terminal, (c) stopping the call origination attempt at the step (a), and storing information as to the call origination, and (d) outputting information in relation to the stopped call origination when the call received at the step (b) is terminated.

17 Claims, 5 Drawing Sheets

MOBILE COMMUNICATION TERMINAL AND CALL CONNECTION METHOD USING THE SAME

This application claims the benefit of Korean Patent Application No. 10-2005-0083314, filed on Sep. 7, 2006, which is hereby incorporated by reference as if fully set forth herein.

BACKGROUND OF THE INVENTION

1. Field of the Invention

The present invention relates to a mobile communication terminal and a call connection method using the same, and more particularly, to a mobile communication terminal and a call connection method using the same which are capable of, when an attempt to originate an outgoing call is stopped due to reception of an incoming call, providing information as to the stopped call origination to the user after termination of the received call, thereby enabling the stopped call origination to be easily and conveniently resumed.

2. Discussion of the Related Art

Conventionally, when a mobile communication terminal receives a call from the external of the terminal while the user of the terminal attempts to originate an outgoing call, the terminal forcibly terminates the call originating procedure, to process the received call. When the received call is terminated, the terminal is changed to an idle screen display state while disregarding the previously-attempted call origination.

In this case, there is an inconvenience in that the user should repeat the same procedure as the procedure previously carried out for call origination. Furthermore, the user may forget the call origination attempt itself.

SUMMARY OF THE INVENTION

Accordingly, the present invention is directed to a mobile communication terminal and a call connection method using the same that substantially obviate one or more problems due to limitations and disadvantages of the related art.

An object of the present invention is to provide a mobile communication terminal and a call connection method using the same which are capable of, when an attempt to originate an outgoing call is stopped due to reception of an incoming call, providing information as to the stopped call origination to the user after termination of the received call.

Another object of the present invention is to provide a mobile communication terminal and a call connection method using the same which are capable of, when an attempt to originate an outgoing call is stopped due to reception of an incoming call, enabling the stopped call origination to be easily and conveniently resumed after termination of the received call.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a call connection method in a mobile communication terminal, comprises: (a) attempting origination of a call to a first terminal; (b) receiving a call from a second terminal; (c) stopping the call origination attempt at the step (a), and storing information as to the call origination; and (d) outputting information in relation to the stopped call origination when the call received at the step (b) is terminated.

The step (a) may comprise assigning an ID to the call origination. The step (c) may comprise keeping the origination call ID assigned at the step (a).

The call origination information may include a phone number of the first terminal.

The step (d) may comprise inquiring of whether or not the stopped call origination should be resumed.

The call connection method may further comprise: (e) resuming the stopped call origination, using the stored call origination information, when a resumption command signal for the stopped call origination is received.

The call connection method may further comprise: (f) resuming the stopped call origination, using the stored call origination information, in response to the termination of the received call.

In another aspect of the present invention, a mobile communication terminal comprises: a memory; a mobile communication module for performing data transmission and reception with a mobile telecommunications network; and a controller which stops an attempt to originate a call to a first terminal upon receiving a call from a second terminal via the mobile communication module during the call origination attempt, stores information as to the call origination in the memory, and outputs information in relation to the stopped call origination when the received call is terminated.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may obscure the subject matter of the present invention.

Figure 1:
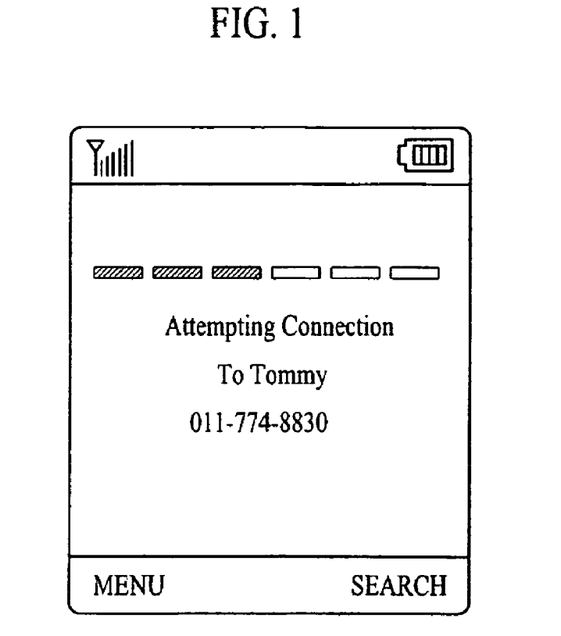
FIG. 1 is a schematic view illustrating an example of a screen displaying a call origination attempt.
Figure 2:
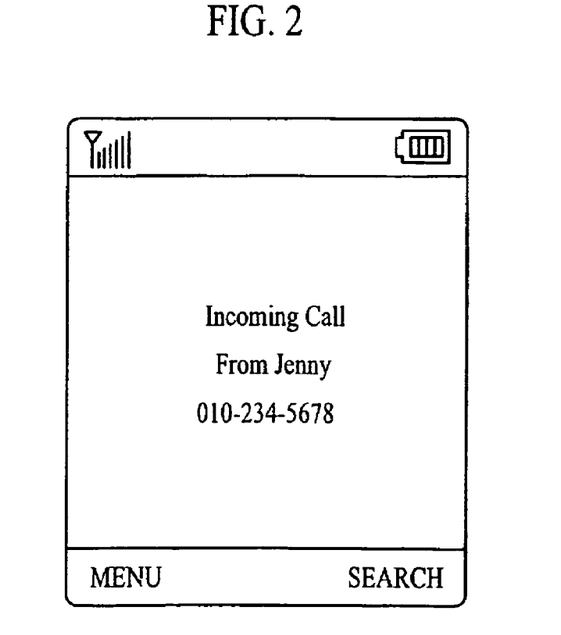
FIG. 2 is a schematic view illustrating an example of a call reception screen.

In association with the description of the preferred embodiments of the present invention, it is assumed that the following condition has been established. That is, it is assumed that the user of a mobile communication terminal (hereinafter, referred to as a "user A"), inputs the phone number of the counterpart (hereinafter, referred to as a "user B"), and then presses a SEND button. Under this condition, a screen displaying a state, in which a call is being originated, is generally displayed on a display. FIG. 1 is a schematic view illustrating an example of a screen displaying a call origination attempt. The terminal may receive a call from a third party (hereinafter, referred to as a "user C") during the call origination attempt (before a talk channel is established between the users A and B via a mobile communication system). In this case, in response to the call reception, a screen displaying the call reception is displayed on the display. FIG. 2 is a schematic view illustrating an example of a call reception screen. In response to the call received from the user C, the user A talks over the terminal with the user C.

Figure 3:
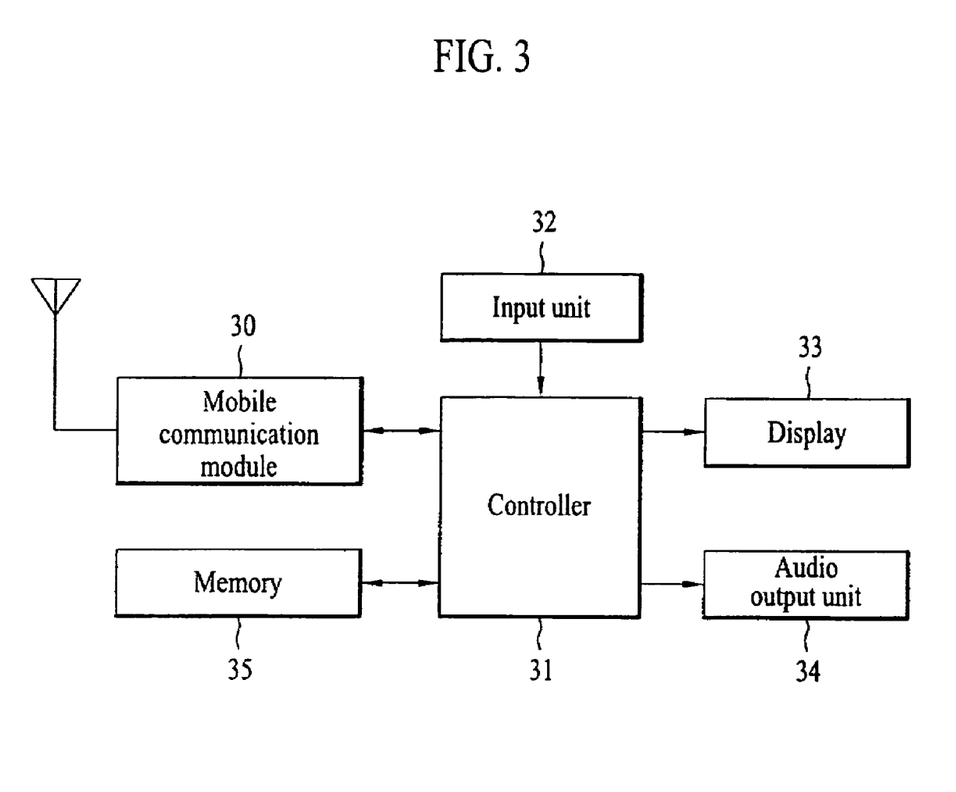
FIG. 3 is a block diagram illustrating a mobile communication terminal according to an embodiment of the present invention.

FIG. 3 is a block diagram illustrating a mobile communication terminal according to an embodiment of the present invention. Referring to FIG. 3, the mobile communication terminal according to the illustrated embodiment of the present invention will be described in detail.

The mobile communication terminal according to the illustrated embodiment of the present invention includes a mobile communication module 30, a controller 31, an input unit 32, a display 33, an audio output unit 34, and a memory 35.

Hereinafter, the basic function and operation of each constituent element as described above will be described. The mobile communication module 30 is a module for transmitting and receiving radio signals for data transmission and reception with a mobile telecommunications network. The controller 31 controls the mobile communication module 30, input unit 32, display 33, and memory 35, to control the overall operation of the mobile communication terminal. The input unit 32 is a unit for receiving various information or commands input by the user. The input unit 32 may be implemented in the form of a keypad provided with various numeral/character keys or a touch screen. The display 33 is a unit for displaying the status of the mobile communication terminal or diverse information. The audio output unit 34 is a unit for outputting audio in accordance with a control signal output from the controller 31. The memory 35 stores therein a certain program for controlling the overall operation of the mobile communication terminal. In particular, the memory 35 stores data input or output during the overall operation of the mobile communication terminal, and various data processed during the overall operation of the mobile communication terminal.

Hereinafter, the mobile communication terminal having the above-described configuration according to the illustrated embodiment of the present invention will be described in detail in conjunction with an operation of the controller 31.

When a call from the user C is received by the terminal via the mobile communication module 30 during an attempt of the user A to originate a call to the user B, the controller 31 stops the call origination attempt, and stores information as to the call origination in the memory 35.

The information as to the call origination may include the phone number of a called party to which a call has been attempted to be originated. When information as to the called party has been stored in the memory 35 (for example, when the name and phone number of the called party has been recorded in a phone book stored in the memory 35), the information as to the call origination may include an identifier for the called party (for example, name).

Meanwhile, the controller 31 assigns an origination call ID in response to the call origination attempt of the user A. Generally, the controller 31 releases the assigned origination call ID when an incoming call is received from the external of the terminal. In accordance with the present invention, however, the assigned origination call ID can be kept even when the call origination attempt is stopped in response to the incoming call received during the call origination attempt.

In addition, the controller 31 can set a flag representing whether or not a call origination attempt has been made. The flag may be included in the call origination information. For example, the controller 31 sets the flag to 0 (false) unless a call from the external of the terminal is received during a call origination attempt of the user. On the other hand, when a call from the external of the terminal is received during the call origination attempt of the user, the controller 31 sets the flag to 1 (true). Accordingly, for example, when the set flag is checked to be 1 in accordance with a flag checking operation carried out after the termination of a call connection of the terminal with the calling party, it can be seen that a call origination attempt was made. Alternatively, the flag may be set to 1 when a call origination attempt is made.

When the received call is terminated (namely, the call connection or conversation between the users A and C is terminated), the controller 31 informs the user A of the call origination attempt stopped status, using the call origination information stored in the memory 35.

Here, the controller 31 may output information in relation to the call origination attempt stopped status, using various methods. Several examples of these methods are as follows.

First, the controller 31 may output the fact that a call origination to the user B was attempted before a call connection with the user C, by outputting the call origination information. For example, the controller 31 may display a message "A call from Jenny was received while you were calling Tommy on Jan. 2, 2006." on the display 33. Alternatively, the message may be output in the form of voice through the audio output unit 34. Of course, the text and voice messages may be simultaneously output.

Second, the controller 31 may output a message inquiring the user A of whether or not the stopped call origination should be resumed, using the call origination information stored in the memory 35. For example, the controller 31 may display a message "A call from Jenny was received while you were calling Tommy on Jan. 2, 2006. If you wish to continue calling Tommy, please press the SEND button." on the display 22, or output the message through the audio output unit 34. Also, the text and voice messages may be simultaneously output.

The controller 31 can resume the stopped call origination, using one of the following methods.

In accordance with a first method, the controller 31 inquires the user A of whether or not the stopped call origination should be resumed, after the termination of the received call. Upon receiving a call origination resumption command signal from the user A via the input unit 32, the controller 31 resumes the stopped call origination via the mobile communication module 30 in response to the received resumption command signal, using the stored call origination information.

In accordance with a second method, the controller 31 simply outputs information in relation to the call origination stopped status, without inquiring whether or not the stopped call origination should be resumed. In response to the termination of the received call, the controller 31 automatically resumes the stopped call origination via the mobile communication module 30, using the stored call origination information.

Thus, in accordance with the present invention, it is possible to not only enable the user A to recognize the call origination stopped status, but also to resume the stopped call origination in an automatic manner or in accordance with one-time clicking of a function button for call origination resumption, without phone number re-input for the call origination resumption, after the termination of the received call.

Figure 4:
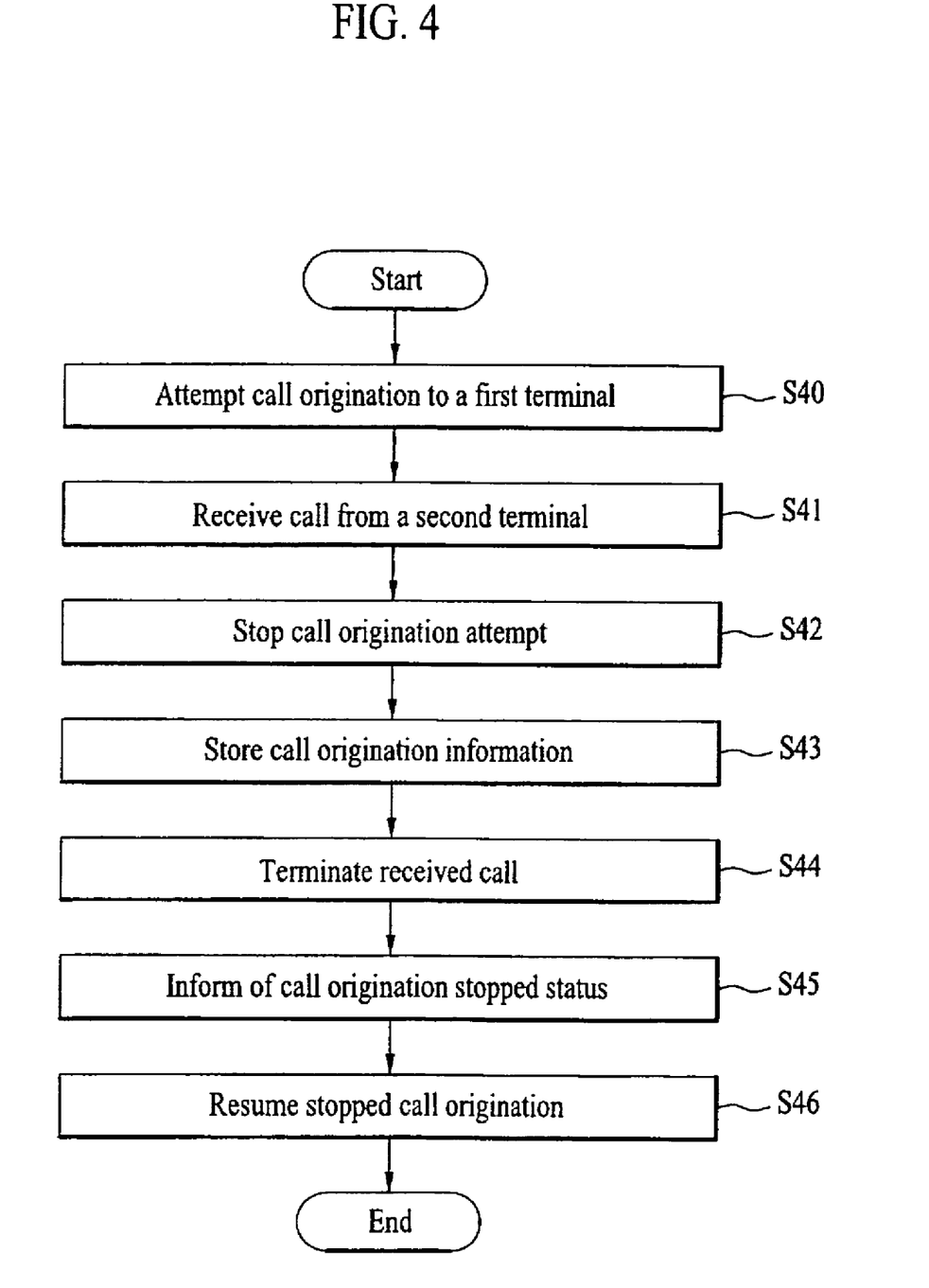
FIG. 4 is a flow chart illustrating a call connection method in a mobile communication terminal according to an embodiment of the present invention.

FIG. 4 is a flow chart illustrating a call connection method in a mobile communication terminal according to an embodiment of the present invention.

Hereinafter, the call connection method will be described in detail with reference to FIG. 4. The following call connection method may be implemented using the above-described mobile communication terminal according to the present invention.

First, a call origination to a first terminal is attempted (S40). A call from a second terminal is received during the call origination attempt (S41). In detail, in response to the attempted call origination, an ID is assigned to the attempted call origination at step S40. Hereinafter, this ID is referred to as an "origination call ID".

In response to the received call, the call origination attempt at step S40 is stopped (S42). Information as to the call origination is also stored (S43). The details of the call origination information are the same as described above. Although the call origination attempt is stopped, the origination call ID assigned at step S40 in accordance with the call origination attempt is kept.

When the received call is terminated (S44), the user of the terminal is informed of the call origination stopped status, using the stored call origination information (S45). In detail, at step S45, the user of the terminal may be inquired of whether or not the stopped call origination should be resumed.

The stopped call origination is then resumed, using the stored call origination information (S46). In detail, the resumption of the stopped call origination at step S46 can be executed using one of the following two methods. That is, as described above in the description of the mobile communication terminal according to the present invention, there are a first method in which, upon receiving a call origination resumption command signal from the user of the terminal, the controller resumes the stopped call origination in accordance with the received resumption command signal, and a second method in which, in response to the termination of the received call, the controller automatically resumes the stopped call origination.

Figure 5:
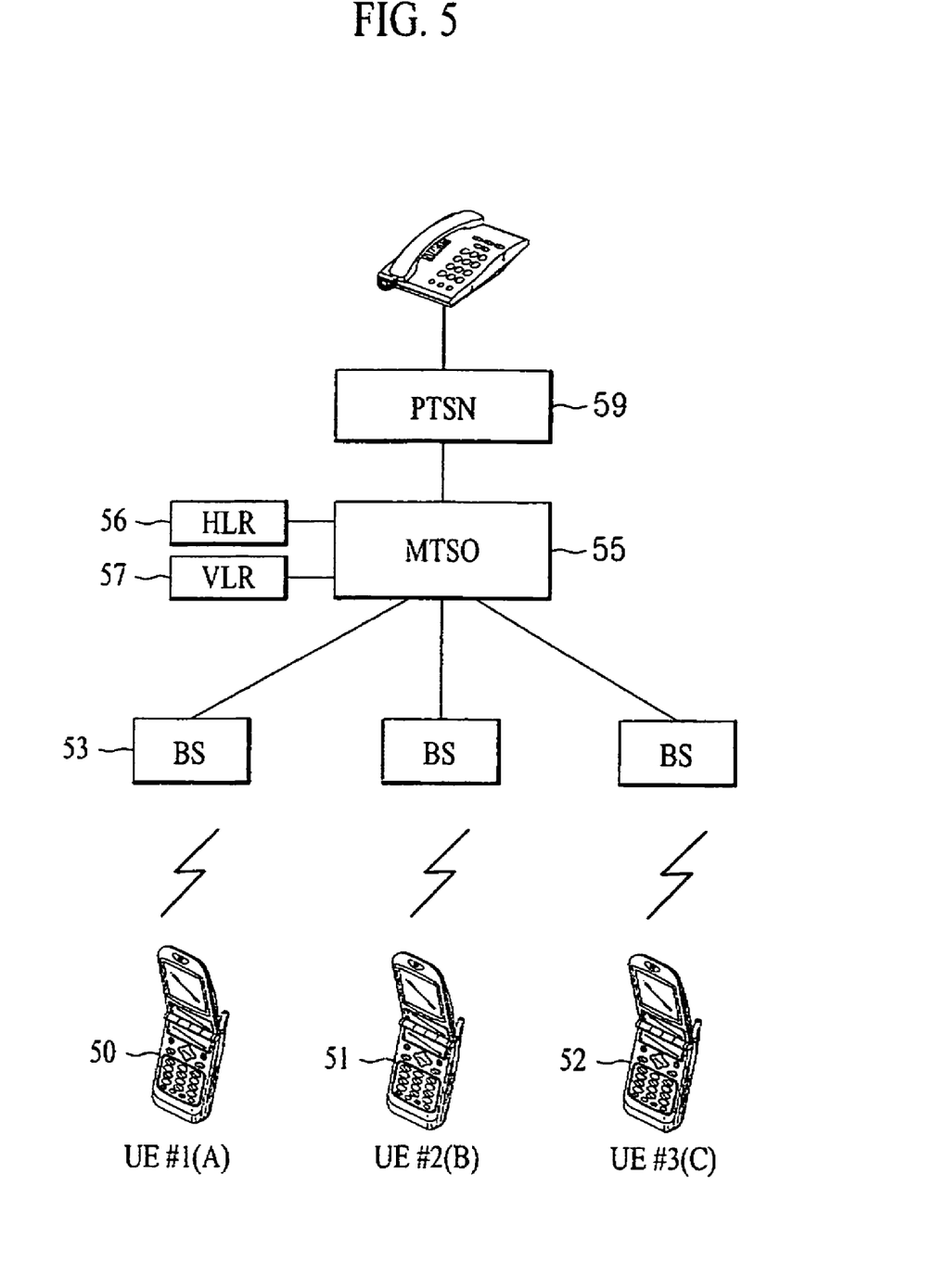
FIG. 5 is a block diagram illustrating an example of a mobile communication system in which the call connection method according to the present invention is implemented.
Figure 6:
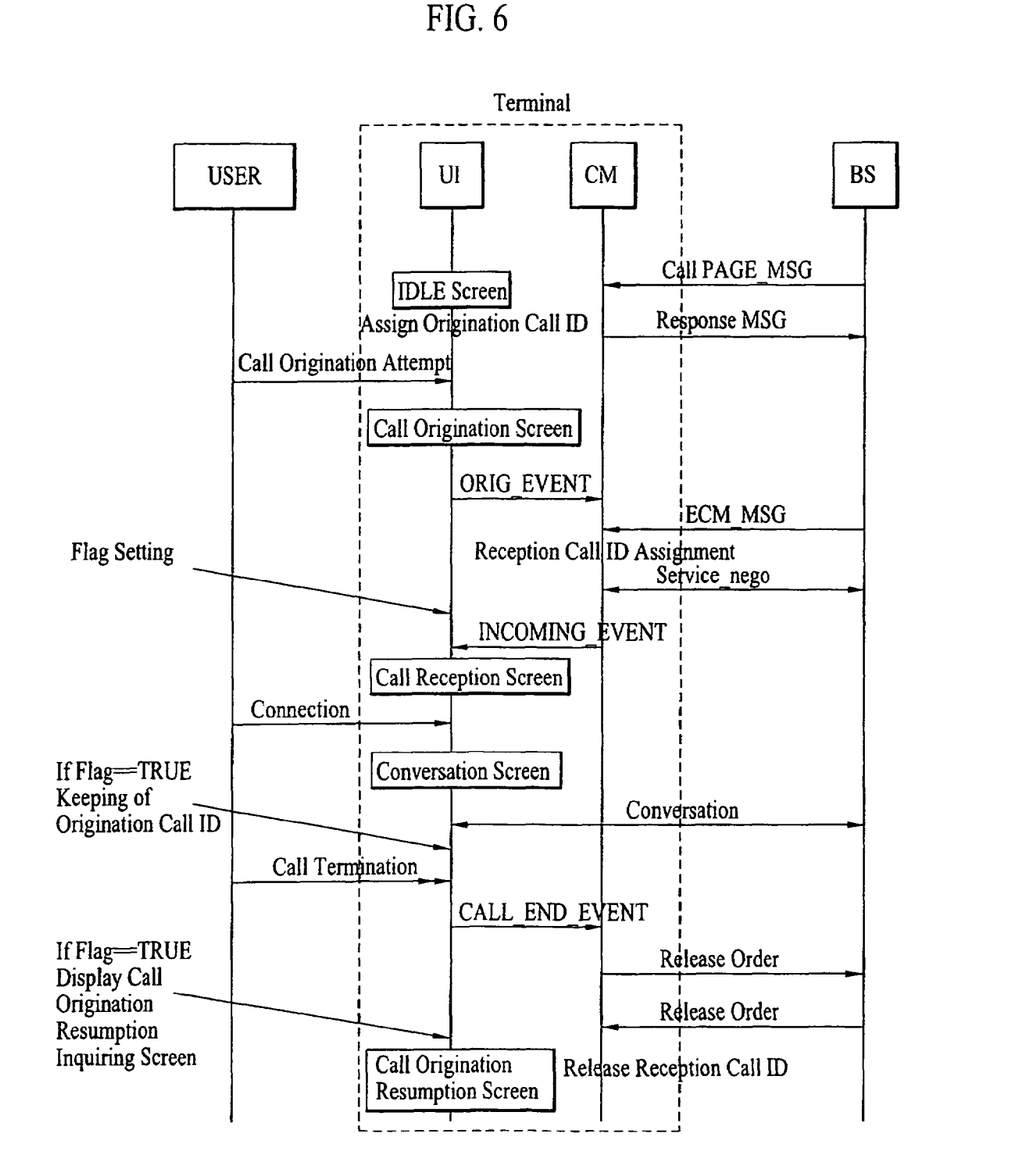
FIG. 6 is a schematic diagram illustrating flows of signals among a user, a terminal, and a base station in accordance with the present invention.

FIG. 5 is a block diagram illustrating an example of a mobile communication system in which the call connection method according to the present invention is implemented. FIG. 6 is a schematic diagram illustrating flows of signals among a user, a terminal, and a base station in accordance with the present invention. An embodiment of the mobile communication system, in which the call connection method according to the present invention is implemented, will be described with reference to FIGS. 5 and 6.

The mobile communication system, in which the call connection method according to the present invention is implemented, includes a plurality of terminals, for example, three terminals 50, 51, and 52 in the illustrated case, base stations (BS) 53, a mobile telecommunications switching office (MTSO) 55, a home location register (HLR) 56, and a visitor location register (VLR) 57. Each BS 53 is connected to the MTSO 55. Thus, one MTSO 55 is in charge of several BSs 53. The MTSO 55 functions to connect a call between calling and called ones of the terminals. The MTSO 55 is connected to a public telecommunications switching network (PTSN) 59, to connect a mobile subscriber of the mobile telecommunications network to a fixed subscriber of the PTSN 59. Since the detailed features of the BSs 53, MTSO 55, HLR 56, VLR 57, and PTSN 59 are irrespective of the present invention, and are well known, no detailed description thereof will be given. Here, the terminals 50, 51, and 52 will be referred to as terminal-A, B, and C, respectively. In FIG. 6, "UI" represents a user interface, and "CM" represents a communication module.

In an idle status, the terminal-A 50 retrieves page messages PAGE_MSG periodically transmitted from the associated BS 53 to the terminal-A 50, and transmits response messages to the BS 53, respectively.

When the user of the terminal-A 50 attempts origination of a call to the terminal-B 51 on an idle screen displayed on the terminal-A 50, the terminal-A 50 assigns an origination call ID in response to the call origination, and displays a call origination screen via the UI. When an extended channel assignment message EXAM_MSG from the BS 53 is received by the terminal-A 50 before a talk channel is established between the terminal-A 50 and the terminal-B 51 in accordance with the call origination, the terminal-A 50 recognizes reception of a call from the terminal-C 52. That is, the BS 53 transmits the extended channel assignment message EXAM_MSG to the terminal-A 50 when the terminal-C 52 calls the terminal-A 50, thereby enabling the terminal-A 50 and terminal-C 52 to enter a traffic channel.

In response to the call reception, the terminal-A 50 stops the call origination. At this time, the terminal-A 50 sets the flag of the call origination information to 1 (true). The flag of 1 represents that it is necessary to display a call origination resumption screen when the received call is terminated, because a call from a third party was received during the call origination attempt. In a status other than the above-described status, the flag is set to 0 (false).

When a terminal attempts a call origination, it generally transmits an origination message to a BS associated therewith. In the present invention, however, when the terminal-A 50 receives a page message PAGE_MSG from the terminal-C 52 calling the terminal-A 50, during a call origination attempt, and transmits a corresponding response message to the BS 53, the CM of the terminal-A 50 prevents the attempted call origination, and prevents transmission of an origination message to the BS 53.

In response to the call received from the terminal-C 52, the terminal-A 50 assigns a reception call ID, and displays a call reception screen. Since the set value of the flag is 1, the assigned origination call ID is kept without being released during the call connection between the terminal-A 50 and the terminal-C 52.

When the call connection between the terminal-A 50 and the terminal-C 52 is terminated, the assigned reception call ID is released. The set value of the flag is then retrieved. When the retrieved flag value is 1, a call origination resumption screen is displayed, in order to resume the call origination previously attempted and stopped before the call connection between the terminal-A 50 and the terminal-C 52.

The user of the terminal-A 50 may resume or cancel the call origination to the terminal-B 51, on the displayed call origination resumption screen.

As apparent from the above description, the mobile communication terminal and the call connection method using the same according to the present invention provide various effects as follows.

First, in accordance with the present invention, when an attempt to originate an outgoing call is stopped due to reception of an incoming call, information as to the stopped call origination is provided to the user after termination of the received call. Accordingly, it is possible to call the user's attention to the call origination stopped status.

Second, in accordance with the present invention, when an attempt to originate an outgoing call is stopped due to reception of an incoming call, it is possible to easily and conveniently resume the stopped call origination after the termination of the received call. Accordingly, it is unnecessary for the user to repeat the same call origination procedure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A call connection method in a mobile communication terminal, comprising:
   (a) attempting origination of a call to a first terminal;
   (b) receiving a call from a second terminal before a call between the mobile communication terminal and the first terminal is connected according to the call origination attempt at step (a);
   (c) setting a flag to a value of 1 (true) wherein the flag represents whether or not the call origination attempt has been made;
   (d) stopping the call origination attempt at the step (a) before the call between the mobile communication terminal and the first terminal is connected, and storing information as to the stopped call origination, wherein the stored information as to the stopped call origination includes the flag set to the value of 1 (true) at the step (c);
   (e) checking whether or not the value of the set flag is 1 (true) when the call received at the step (b) is terminated;
   (f) outputting the stored information as to the stopped call origination automatically using at least one of a display unit and an audio unit if it is checked the set flag is set to the value of 1 (true) at the step (e); and
   (g) resuming the stopped call origination using the stored information as to the stopped call origination output at the step (f).

2. The call connection method according to claim 1, wherein:
   the step (a) comprises assigning an ID to the call origination; and
   the step (d) comprises keeping the origination call ID assigned at the step (a).

3. The call connection method according to claim 1, wherein the step (f) comprises inquiring of whether or not the stopped call origination should be resumed.

4. The call connection method according to claim 1, wherein the step (g) resumes the stopped call origination when a resumption command signal for the stopped call origination is received.

5. The call connection method according to claim 1, wherein the step (g) resumes the stopped call origination automatically in response to the termination of the received call at the step (b).

6. A mobile communication terminal comprising:
   a memory;
   a display unit;
   an audio output unit;
   a mobile communication module configured to perform data transmission and reception with a mobile telecommunications network; and
   a controller configured to
      attempt origination of a call to a first terminal using the mobile communication module,
      receive a call from a second terminal using the mobile communication module before a call between the mobile communication terminal and the first terminal is connected according to the call origination attempt,
      set a flag to a value of 1 (true), wherein the flag represents whether or not the call origination attempt has been made,
      stop the call origination attempt before the call between the mobile communication terminal and the first terminal is connected,
      store information as to the stopped call origination in the memory, wherein the stored information includes the flag set to the value of 1 (true),
      check whether or not the value of the set flag is 1 (true) when the received call is terminated.
      output the stored information as to the stopped call origination automatically using at least one of the display unit and the audio output unit if it is checked the value of the set flag is 1 (true), and
      resume the stopped call origination using the stored information as to the output stopped call origination.

7. The mobile communication terminal according to claim 6, wherein the controller is further configured to assign an ID to the call origination, and to keep the assigned origination call ID even when the call origination attempt is stopped.

8. The mobile communication terminal according to claim 6, wherein the call origination information includes a phone number of the first terminal.

9. The mobile communication terminal according to claim 6, wherein the controller is further configured to determine whether or not the stopped call origination should be resumed, when the received call is terminated.

10. The mobile communication terminal according to claim 9, wherein the controller is further configured to resume the stopped call origination through the mobile communication module, using the stored call origination information, when the controller receives a resumption command signal for the stopped call origination.

11. The mobile communication terminal according to claim 6, wherein the controller is further configured to resume the stopped call origination through the mobile communication module, using the stored call origination information, in response to the termination of the received call.

12. The call connection method according to claim 1, wherein the call includes a message.

13. The call connection method according to claim 12, wherein
   the step (a) comprises attempting the origination of the message to the first terminal,
   the step (d) comprises stopping the message attempt of step (a) and storing information about the message origination, and
   the step (f) comprises inquiring whether or not the stopped message origination should be resumed.

14. The call connection method according to claim 13, wherein the step (g) resumes the stopped message origination using the stored message origination information, when a resumption command signal for the stopped message origination is received.

15. The mobile communication terminal according to claim 6, wherein the call includes a message.

16. The mobile communication terminal according to claim 15, wherein the controller is further configured to attempt the origination of the message to the first terminal,
stop the message origination attempt according to receiving the call from the second terminal,
store information as to the stopped message origination, and
determine whether or not the stopped message origination should be resumed.

17. The mobile communication terminal according to claim 16, wherein the controller is further configured to resume the stopped message origination using the stored message origination information in response to a stopped message resumption command signal.

* * * * *